United States Patent [19]
Schnell

[11] 3,737,062
[45] June 5, 1973

[54] WHEELED VEHICLE

[75] Inventor: Gerhard Schnell, Stuttgart, Germany

[73] Assignee: Robert Bosch GmbH, Stuttgart, Germany

[22] Filed: Oct. 20, 1971

[21] Appl. No.: 190,943

[30] Foreign Application Priority Data
   Oct. 21, 1970   Germany.....................P 20 51 585.9

[52] U.S. Cl..............................214/670, 214/DIG. 10
[51] Int. Cl................................................B66f 9/10
[58] Field of Search.....................214/660, 670, 730, 214/DIG. 10, 75 G; 180/25 R

[56] References Cited
UNITED STATES PATENTS

| | | | |
|---|---|---|---|
| 3,381,836 | 5/1968 | Ulinski | 214/730 |
| 800,710 | 10/1905 | Bishman | 180/26 R |
| 1,702,809 | 2/1929 | Brown | 180/24.02 |
| 2,635,711 | 4/1953 | Turner | 180/21 |
| 2,190,397 | 2/1940 | Bugatti | 180/1 R |

FOREIGN PATENTS OR APPLICATIONS

| | | | |
|---|---|---|---|
| 1,159,709 | 7/1969 | Great Britain | 214/670 |
| 987,637 | 3/1965 | Great Britain | 214/730 |

*Primary Examiner*—Gerald M. Forlenza
*Assistant Examiner*—Lawrence J. Oresky
*Attorney*—Michael S. Striker

[57] ABSTRACT

A substantially constant C-shaped chassis can travel in a first direction and has an open side facing transverse thereto. An upright mast is mounted within the confines of the chassis and can be shiftably displaced in a second direction transverse to the first direction towards and away from the open side. A load-lifting device is provided on the mast, and a displacing arrangement is associated with the mast and with the chassis for displacing the mast with reference to the chassis between the aforementioned positions.

9 Claims, 3 Drawing Figures

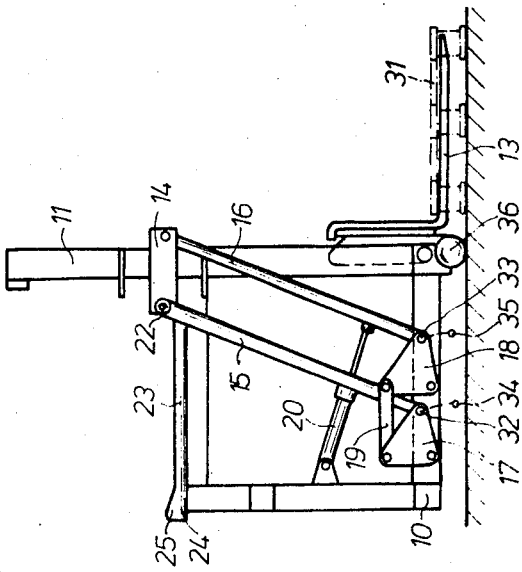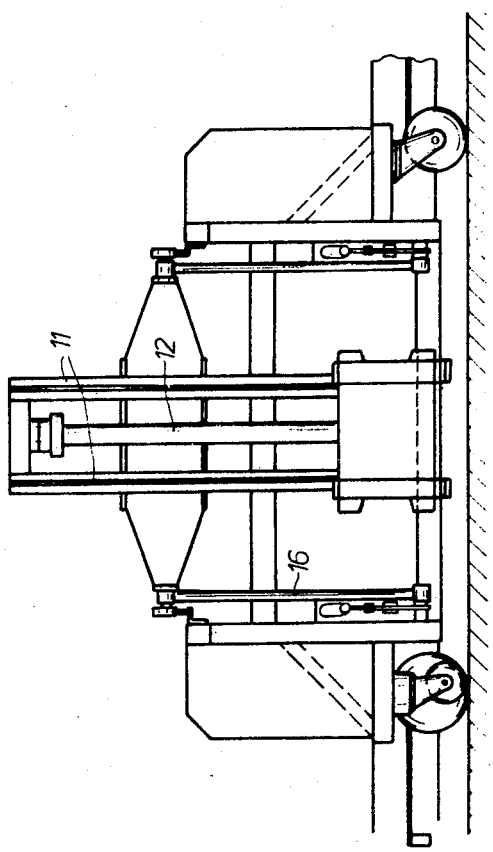

3,737,062

WHEELED VEHICLE

BACKGROUND OF THE INVENTION

The present invention relates generally to a vehicle, and more particularly to a wheeled vehicle. Still more particularly the present invention relates to a load-lifting and load-carrying vehicle.

The invention is concerned in particular with a side-loading vehicle, that is a vehicle having a load-engaging and -lifting device which can move transverse to the direction in which the vehicle normally travels. Vehicles of this type are already known and are highly advantageous for transporting loads in circumstances where the space laterally of the vehicle is very limited, as for instance through corridors in warehouses, between stacks in warehouses and the like. In such circumstances it must be possible to pick up or deposit loads laterally of the vehicle, whereas on the other hand no space is available for turning the vehicle around for maneuvering it as would normally be the case in order to pick up or deposit loads laterally of the vehicle.

The spaces in question, that is corridors or paths between stacks, are normally desired to be as narrow as possible because of economic considerations dictating maximum space utilization. This, on the other hand makes it necessary for vehicles travelling in such corridors to be corresponding small and especially narrow. The vehicles of this type which are known from the art are not as stable in operation, and cannot be as narrow as is desired.

SUMMARY OF THE INVENTION

It is, accordingly, an object of the present invention to overcome the disadvantages of the prior art.

More particularly it is an object of the present invention to provide a wheeled vehicle of the type under discussion which overcomes these disadvantages.

A further object of the invention is to provide such a wheeled vehicle of this type, that is a side-loading vehicle, which is particularly narrow in its construction, but which yet is so constructed that lateral tilting under the influence of a load being picked up or deposited is excluded to a maximum extent.

In pursuance of these above objects, and of others which will become apparent hereafter, one feature of the invention resides in a wheeled vehicle which, briefly stated, comprises a substantially C-shaped chassis adapted for travel in a first direction and having an open side facing transverse thereto. An upright mast is mounted within the confines of the chassis for shifting displacement in a second direction transverse to the first direction between one position proximal and an other position inwardly spaced from the open side. Load-engaging means is provided on the upright mast, and displacing means is operatively associated with the upright mast and with the chassis for displacing the former with reference to the latter between the above-mentioned positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic side view of a vehicle according to the present invention;

FIG. 2 is a diagrammatic view of the vehicle in FIG. 1, as seen in the direction of normal travel thereof.

DESCRIPTION OF THE PREFERRED EMBODIMENTS

Figure 3:
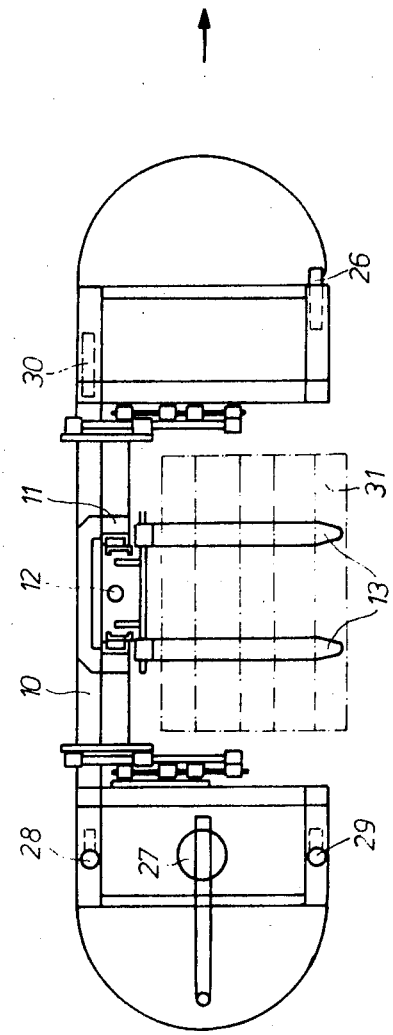
FIG. 3 is a plan view of the vehicle in FIGS. 1 and 2.

Discussing the drawing now in detail it will be seen that reference character 10 identifies a chassis of substantially C-shaped outline. Of course, a U-shaped outline is to be included in this definition as long as the arms of the U are short enough. In any case, the chassis 1 is provided with an upright mast 11 on which there is mounted a load-engaging device 13 which can be raised and lowered with the aid of a cylinder and piston unit 12; in known manner the cylinder and piston unit 12 can be operated hydraulically, pneumatically or in other ways. A transverse member 14 is provided on which two arms 15 and 16 are pivoted with one end each, with their second ends being pivotably connected with members 17 and 18 which are in turn pivoted to the chassis 10 and connected with one another in articulated manner by a member 19. A hydraulic cylinder 20 is connected to the member 16 and to the chassis 10 at 21.

The member 14 is provided with a guide roller 22 which rolls on a member 23 which at its end portion 24 has a raised section 25. A supporting roll 36 is provided at the lower end and beneath the mast 11.

In the direction of movement at the forward end of the chassis 10, there are provided two wheels or rollers 26 and 30, and at the rearward or tailing end there is provided a drive wheel 27 which is driven in suitable manner, for instance by a non-illustrated motor or engine. Wheels 30 and 27 are connected with one another by suitable linkage means so that the vehicle can turn in a very narrow radius when it is outside the corridors between the stacks or the like, it being evidently impossible to perform turning movements within the corridor. Particularly if the vehicle is heavily loaded, lateral tilting cannot be excluded. In order to avoid this there are provided supporting wheels or rollers 28 or 29 in the proximity of the drive wheel 27. These wheels 28 and 29 may engage the ground only when the vehicle is heavily loaded, or they may prvide a supporting force which depends in its magnitude upon the load being carried and which can be changed by a variation in the pretension of a non-illustrated spring which urges them towards the ground. The wheels 28 and 29, as well as the wheel 26, are self-adjusting wheels or guide rollers, that is they will adjust themselves to always point in the direction of movement of the vehicle without requiring steering by an operator.

The vehicle will normally move in the direction of the arrow through the passages or corridors provided, for instance of a warehouse or the like. If a load, such as a pallet 31, is to be picked up then the hydraulic cylinder 20 is actuated which pivots the members 15 and 16, thereby moving the mast 11 to the position shown in FIG. 2. The member 13 has previously been moved to its lowermost position and engages the pallet 31 from below; in so doing, the mast 11 is supported by the roller 36 which in the illustrated position of the mast engages the ground. With reference to the chassis 10 only a small tilting moment exists under such circumstances, because the edge about which tilting would occur is determined by the position of the roller 36, and the counterweight is constituted by the chassis 10 with all components mounted thereon.

When the load has been engaged, the hydraulic cylinder 20 is again actuated in a sense retracting the mast 11, thereby pivoting the members 15 and 16 in direction oppositely to their original pivoting movement. During this operation, the guide roller 22 affords additional lateral guidance for the mast 11. When the members 15 and 16 are tilted or pivoted, the pivots 32 and 33 move in the broken-line paths to their positions at 34 and 35, and the member 19 enforces an analogous movement of the members 17 and 18 and thereby of the members 15 and 16 at the same time. When the mast approaches its end position, the roller 22 reaches the end portion 24 of the member 23, rolling up over the raised part 25 and lifting the mast 11 with the supporting rollers 36 off the ground, so that when the vehicle moves in its normal direction of movement as indicated with the arrow, the roller 36 cannot exert any influence upon the movements of the vehicle. Of course, after the vehicle has then travelled to a position at which the pallet 31 is to be deposited, the operation is repeated and the pallet can then be deposited where necessary.

The construction having the components 15 and 16, the components 17 and 18, as well as the components 19 and 20, and also the component 23, can be located on either side of the mast 11; in other words, two such constructions can be provided on located at each side of the mast. However, a single construction can also be provided as illustrated in the drawing.

The guide roller 23 may be provided with a flange which provides a further lateral guidance with respect to the member 23 in order to further improve the lateral guidance of the mast 11.

By guiding the mast 11 via coupled parallelogram linkages the construction of the vehicle can be made narrow so that the vehicle can travel even in narrow corridors and spaces. On the other hand, the support of the mast by the roller or rollers 36 during the movement to loading and to travelling position achieves a small tilting moment with reference to the chassis. The position of the wheels on the chassis has no influence on the tilting moment during loading and unloading because the point about which the tilting action would have to take place is determined by the position of the roller 36. On the other hand, the roller or rollers 36 cannot disadvantageously influence the travel of the vehicle because the mast and the roller or rollers is lifted out of engagement with the ground shortly before the mast reaches its end position as it is being retracted.

It will be understood that each of the elements described above, or two or more together, may also find a useful application in other types of constructions differing from the types described above.

While the invention has been illustrated and described as embodied in a wheeled vehicle, it is not intended to be limited to the detail shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the means and range of equivalence of the following claims.

What is claimed as new and desired to be secured by Letters Patent is set forth in the appended claims.

I claim:

1. A wheeled vehicle, comprising a substantially C-shaped chassis adapted for travel in a first direction and having an open side facing transverse thereto; an upright mast mounted within the confines of said chassis for shifting displacement in a second direction transverse to said first direction between one position proximal to and an other position inwardly spaced from said open side; load-engaging means on said upright mast; displacing means operatively associated with said upright mast and said chassis for displacing the former with reference to the latter between said positions; guide rail means on said chassis extending in said second direction and having a guide surface provided with an end portion inwardly spaced from said open side and located at a higher level than the level of the remainder of said guide surface; and guide roller means on said mast and rolling on said guide rail means for guiding said mast during movement between said positions thereof, said mast being raised by the difference between said levels on displacement from said one towards said other position.

2. A vehicle as defined in claim 1, wherein said displacing means comprises at least two parallel arms having respective first end portions pivotally connected with said mast and second end portions connected with said chassis.

3. A vehicle as defined in claim 2; further comprising connecting means pivotably connecting said second end portions with said chassis.

4. A vehicle as defined in claim 3, said connecting means comprising a pair of connecting elements, first pivot means pivotably connecting each of said elements with said chassis, and second pivot means pivotably connecting each of said second end portions to one of said elements remote from the respective first pivot means.

5. A vehicle as defined in claim 4; further comprising coupling means coupling said elements for pivotal movement in unison.

6. A vehicle as defined in claim 1, said mast having a lower end portion adjacent the ground on which said vehicle travels; and further comprising a support roller provided on said lower end portion and being in engagement with said ground when said mast is in said one position and out of engagement with said ground when said mast is in said other position.

7. A vehicle as defined in claim 1, said chassis having two longitudinally spaced terminal portions; further comprising a pair of steerable wheels on one of said terminal portions, a driven wheel at the other of said terminal portions, and at least one supporting wheel also on the other of said terminal portions in the vicinity of said driven wheel.

8. A vehicle as defined in claim 7; further comprising an additional supporting wheel also on said other terminal portion in the vicinity of said driven wheel, both of said supporting wheels being at least substantially coaxial with said driven wheel; and further comprising adjustable biasing means adjustably biasing said supporting wheel into supporting engagement with the ground.

9. A vehicle as defined in claim 7, one of said steerable wheels being offset relative to the other of said steerable wheels longitudinally of said chassis towards the middle thereof; and further comprising linkage means linking said one steerable wheel with said driven wheel.

\* \* \* \* \*